5/12/87 X3 RE 32,414

United States Patent [19]

Hutchins et al.

[11] E Patent Number: Re. 32,414

[45] Reissued Date of Patent: May 12, 1987

[54] ROBOT AND CONTROL SYSTEM

[75] Inventors: Burleigh M. Hutchins, Hopkinton; Raymond R. Dunlap, Uxbridge; Louis Abrahams, Worcester, all of Mass.

[73] Assignee: Zymark Corporation, Hopkinton, Mass.

[21] Appl. No.: 827,109

[22] Filed: Feb. 7, 1986

Related U.S. Patent Documents

Reissue of:

[64] Patent No.: 4,507,044
Issued: Mar. 26, 1985
Appl. No.: 328,726
Filed: Dec. 8, 1981

[51] Int. Cl.[4] ..... B66C 23/16

[52] U.S. Cl. ..... 414/744 R; 74/89.22; 187/27; 318/67; 318/568; 414/749; 901/17; 901/21

[58] Field of Search ..... 414/7, 589, 744 R, 744 A, 414/590, 591, 749, 751, 753; 254/283, 286, 334, 338; 187/27, 20; 74/89.2, 89.22, 469; 318/568, 67; 901/17, 21

[56] References Cited

U.S. PATENT DOCUMENTS

| | | | |
|---|---|---|---|
| 3,044,312 | 7/1962 | Hall et al. | 74/89.22 |
| 3,447,050 | 5/1969 | Geis | 318/67 |
| 3,881,369 | 5/1975 | Looney | 74/89.2 |
| 3,890,552 | 6/1975 | Devol et al. | 414/5 X |
| 4,011,493 | 3/1977 | Fukase et al. | 318/568 |

FOREIGN PATENT DOCUMENTS

| | | | |
|---|---|---|---|
| 2531991 | 2/1976 | Fed. Rep. of Germany | 414/7 |

*Primary Examiner*—Robert J. Spar
*Assistant Examiner*—Donald W. Underwood
*Attorney, Agent, or Firm*—Andrew F. Kehoe

[57] ABSTRACT

A compact robot of the 3-axis type comprising a base-mounted motor control system with means to sense the position of a robot arm through a servo-system comprising position-sensing potentiometers mounted in the motor control system and a feed-back control system to co-ordinate the vertical and horizontal movement of a robot arm.

6 Claims, 6 Drawing Figures

36
24
28
30
24
232
66
360
358
332
260
258
92
80
84
62
90
86
82

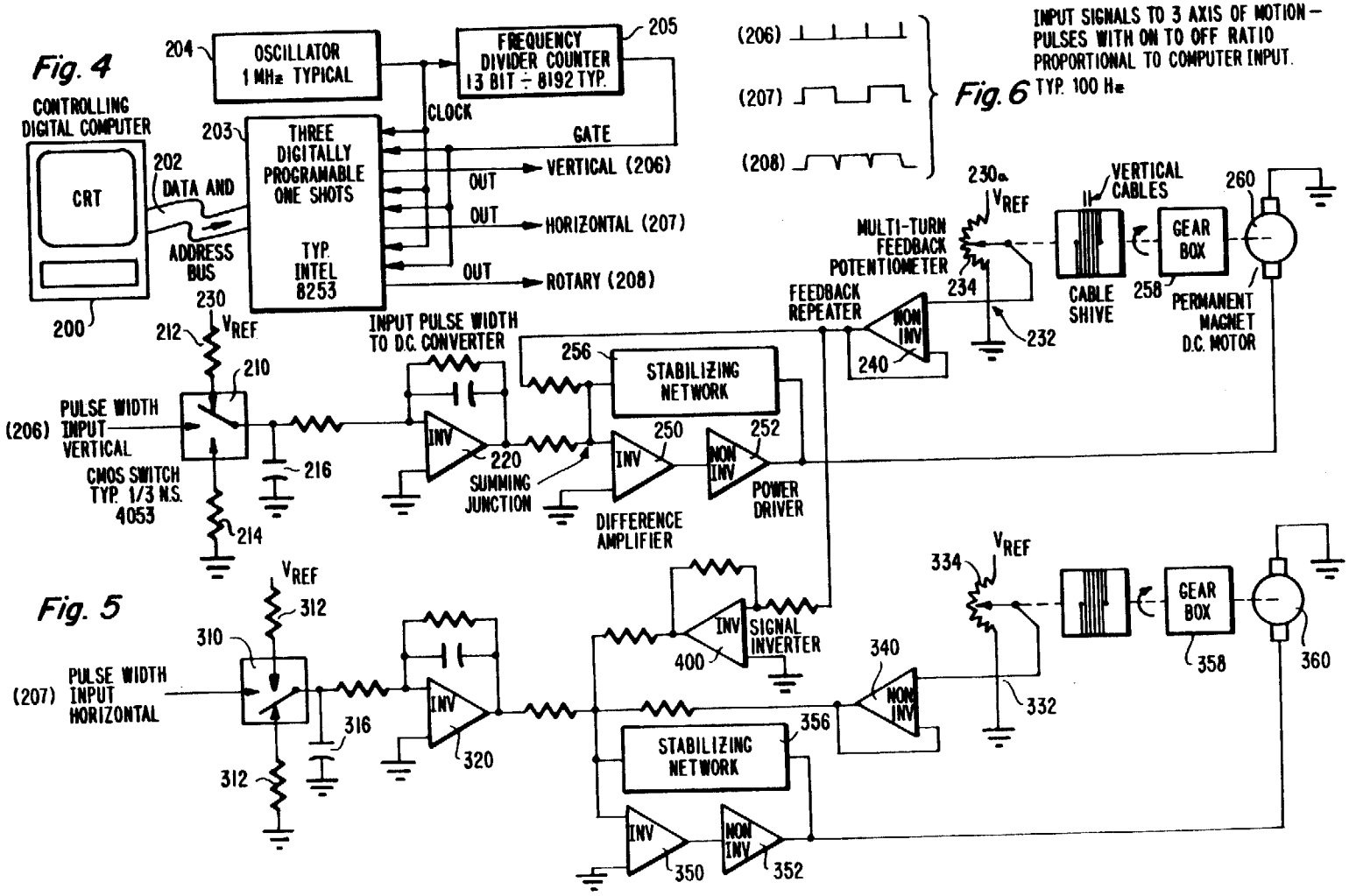
INPUT SIGNALS TO 3 AXIS OF MOTION - PULSES WITH ON TO OFF RATIO PROPORTIONAL TO COMPUTER INPUT.
TYP. 100 Hz
Fig. 6
(206)
(207)
(208)
VERTICAL CABLES
CABLE SHIVE
GEAR BOX
PERMANENT MAGNET D.C. MOTOR
MULTI-TURN FEEDBACK POTENTIOMETER
FEEDBACK REPEATER
NON INV
INV
STABILIZING NETWORK
POWER DRIVER
DIFFERENCE AMPLIFIER
SIGNAL INVERTER
SUMMING JUNCTION
INPUT PULSE WIDTH TO D.C. CONVERTER
CMOS SWITCH TYP. 1/3 N.S. 4053
PULSE WIDTH INPUT VERTICAL
PULSE WIDTH INPUT HORIZONTAL
Fig. 5
FREQUENCY DIVIDER COUNTER 13 BIT ÷ 8192 TYP.
GATE
CLOCK
VERTICAL (206)
HORIZONTAL (207)
ROTARY (208)
OUT
OSCILLATOR 1 MHz TYPICAL
THREE DIGITALLY PROGRAMMABLE ONE SHOTS
TYP INTEL 8253
DATA AND ADDRESS BUS
CONTROLLING DIGITAL COMPUTER
CRT
Fig. 4

ROBOT AND CONTROL SYSTEM

Matter enclosed in heavy brackets [ ] appears in the original patent but forms no part of this reissue specification; matter printed in italics indicates the additions made by reissue.

BACKGROUND OF THE INVENTION

This invention relates to robots and control mechanisms for robots which provide a light, relatively compact, highly versatile, robot system.

A substantial amount of work has been done in robots over the years. An example of a typical robot operable in a three dimensional plane is disclosed in U.S. Pat. No. 4,229,136 to Panissidi and, also, in U.S. Pat. No. 3,661,276 to Wiesener. These patents are particularly illustrative of problems faced by the prior art in providing counterbalancing of such apparatus against gravity. The parent invention relates to the solution of both of these problems.

SUMMARY OF THE INVENTION

It is a principal object of the present invention to provide an improved robot system, one that is versatile with respect to the number and energy requirements of permissable robot tasks, and one which has a highly stable structure.

Another object of the invention is to provide a novel, base-mounted, motor control system for such a robot.

A further object of the invention is to provide a robot which can perform operations in a three dimensional zone, relative to its central structure, which zone comprises an exceptionally large percentage of the total space occupied by the robot.

Another object of the invention is to provide a robot, the arm of which can move smoothly from position to position by a unique positioning of, and control of, its cables.

Another object of the invention is to utilize a unique position-feedback information from said cable-operating motors.

Another object of the invention is to provide an improved process for generating and processing input signals into individual robot motors.

A further object of the invention is to provide means to co-ordinate the vertical and horizontal motor means for said robot arm to achieve a smooth movement and to most efficiently use the energy of the robot.

Another object of the invention is to provide improved means to generate and transmit digital signals through a cable in the time domain, that is in a relatively independent voltage form.

Other objects of the invention will be obvious to those skilled in the art on their reading of this description.

The above objects have been substantially accomplished by the construction of a robot apparatus of the type comprising means to move a robot arm in a vertical direction, in a horizontal direction substantially coaxial with said arm, and in a plane of rotation coplanar with said horizontal direction, wherein motor means for moving said robot arms in said vertical and horizontal directions are mounted on a horizontal turntable with winch means for operating horizontal cable means and vertical cable means, respectively, and wherein, mounted beneath, said turntable is a turntable-rotating motor, and winch and cable means for driving the turntable.

The motor means for moving said vertical or horizontal directions is controlled by a motor control system including means to sense the vertical and horizontal position of said robot arm. Preferably the sensing means comprises a potentiometer mounted on said turntable and forming means to measure the rotational position of each winch means and convert the rotional position into an electrical signal which resulting signals are coordinated through a servo-system with one another to achieve a smooth movement of said robot arm.

These motor means and winch means are the sole means for providing motive power for moving said robot arm. Consequently, very substantial forces can be applied to the robot arm by merely providing large motors in the base. The provision of these motors in the base position only further stabilizes the apparatus.

It should also be understood that the apparatus described herein may be substantially modified, e.g., with respect to the movement and reach of its arm, with no fundamental change in components of the apparatus. For example, were one to wish to provide more travel one could merely increase the length of the cable and, if necessary, the arms. (Moreover, as will be seen below, if one is to utilize a preferred motor control system, one would have to select a winch/potentiometer combination that allows the potentiometer to sense the number of turns and thereby sense the rotary position of the winch.)

In order to provide smooth movement of the arm, it is desirable to co-ordinate the relative speed of cable movement of the vertical cable with the horizontal cable. In the sense used herein the "vertical cable" is conventionally used to describe that cable system which operates the robot arm to move it up and down. Moreover, the term "down" is used to refer to the base position as shown in the drawings. Despite the use of such conventions for the purpose of illustration, and despite the fact that the motor position lends substantial stability in this conventional position, it is to be emphasized that the design of the present system is such that it can be advantageously attached to vertical surfaces and, when desired, to ceilings. Thus it may be conceived as a relatively gravity-independent apparatus although as will be seen from considerations discussed below, it may be more desirable to use different motor systems to maintain desirable gearing ratios when the arm becomes the vertical axis.

It is preferred that direct current, servo motors geared down to the desired operating speed, usually from about 2 to 20 inches per second, be used to drive the cables.

Each of the position-indicating potentiometers is used to send a signal which is indicative of where each winch (and thus each cable and the arm) is at any given time. This signal is fed back and summed with a input signal of different polarity, in the illustrated case a negative signal, which is indicative of where the winch wants to be. Then the winch is driven by an amplified "difference signal". When the difference is zero the winch is where it is supposed to be.

What is achieved by controlling the horizontal motor with reference to the vertical motor is that, were this not done, it would be necessary to have each of the winches for vertical and horizontal movement driven at a precisely determined value when, say, a vertical movement is required. However when the horizontal movement is controlled by, i.e., servoed to, the vertical motor, the desired result is achieved without any need to feed a precise independent input to the horizontal motor to have it respond with proper relationship to the vertical movement.

The illustrated circuit is one way in which the vertical-motor-driving circuit can be utilized to control the activity of the horizontal-motor-driving circuit by a signal inversion means; however numerous other such signal-investing-control means can also be employed.

It would be entirely practical to operate and control the apparatus with stepping motors and, for example, chains or flat straps as cables. However, it has been found particularly advantageous to utilize wire cable with geared-down direct current motors. This allows one to avoid having to deal with resonance- or vibration-imparting problems (which are associated with the use of such cables and stepping motors) with each change in system size.

The placement of the motors on the base reduces bulk, puts the weight near the center of gravity of the robot where it contributes to stability.

Typical travel specifications of the apparatus comprise a 13-inch travel in each of the horizontal and vertical distances. However, it is important to note that there is nothing in the design to preclude the arm from travelling over a much larger range, e.g., three or four feet. The turntable is advantageously adapted to turn more than 360 angular degrees. Additional, e.g., an additional 90-degree, turning capacity allows the apparatus to proceed directly to a nearby work assignment, say the 80 degrees from a 290-degree position to a 360° plus 10° position without the need to go 280° in the other direction.

The position of the motors and associated winches and potentiometers, the centers of gravity of which are positioned substantially within the cylinder out of which the end of the robot arm must remain, is a substantial benefit in stabilizing the robot apparatus.

As is seen from FIGS. 1 and 5, each cable is divided into two segments such that each segment of each cable terminates on the pulley as well as with the robot arm-moving apparatus with which it is associated.

ILLUSTRATIVE EMBODIMENT OF THE INVENTION

In the application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

FIG. 4 is a schematic diagram indicating a preferred way of generating pulses for the motor circuits.

FIG. 5 is a circuit diagram disclosing a preferred way of controlling vertical and horizontal motors.

FIG. 6 illustrates schematically the nature of input signals to the three axis of motion.

Figure 1:
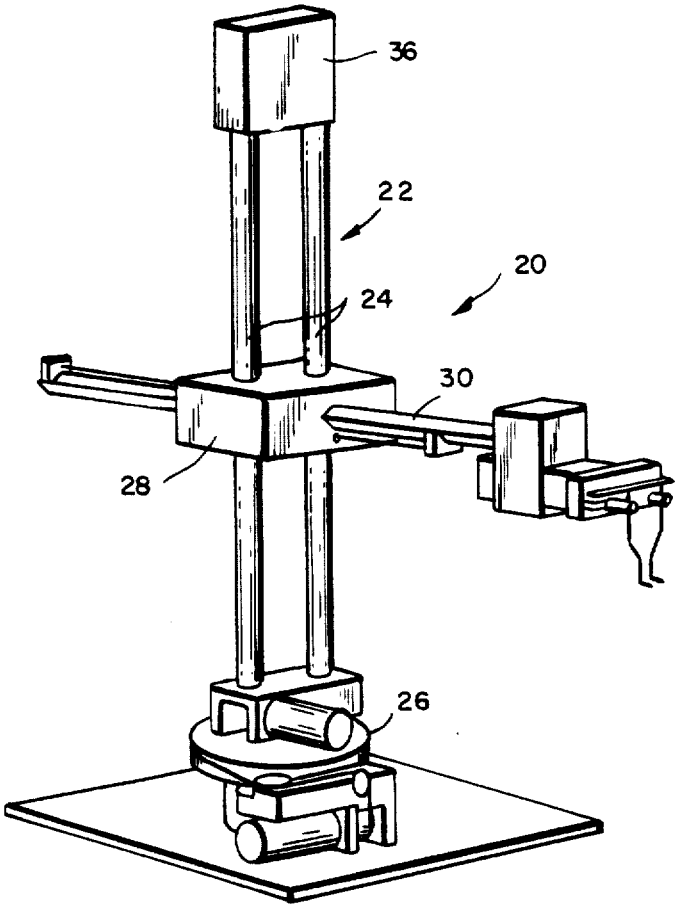
FIG. 1 is perspective view of a robot constructed according to the invention.
Figure 2:
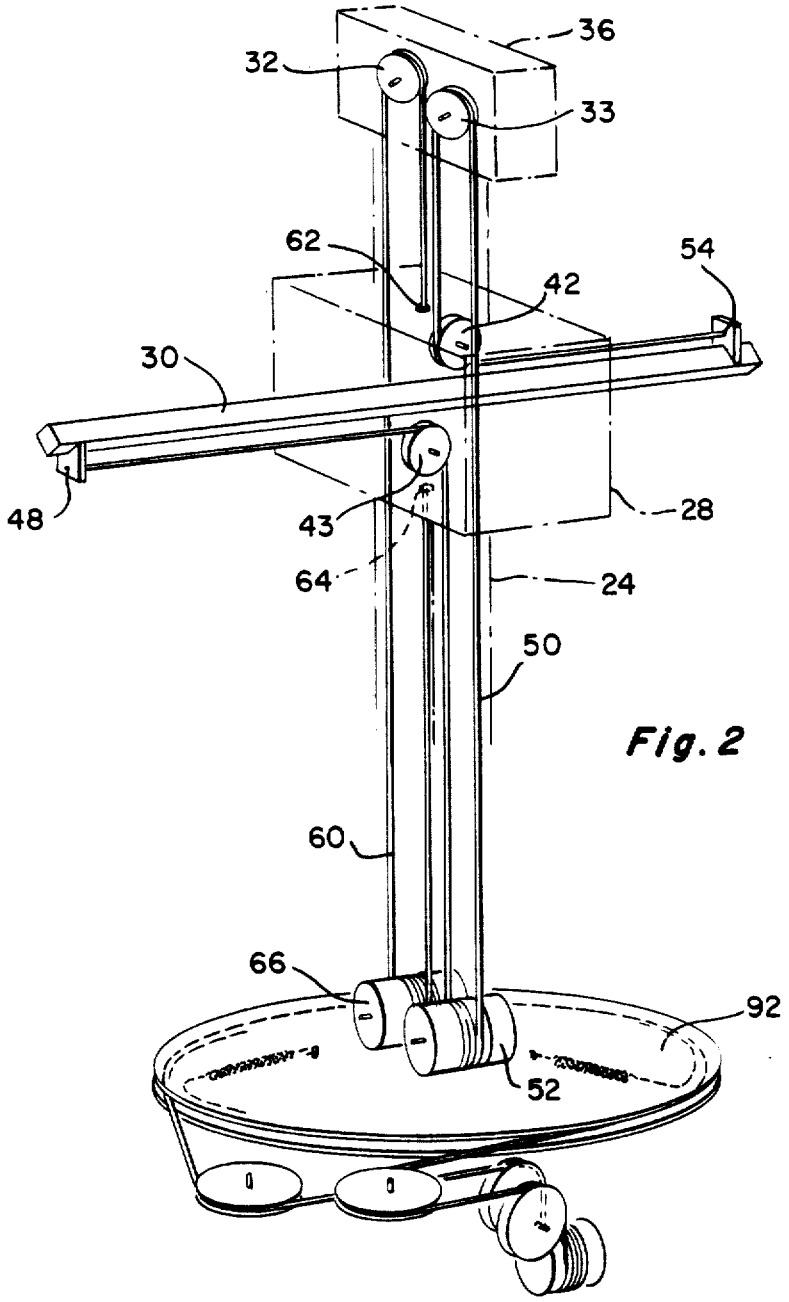
FIG. 2 illustrates a cable diagram indicating the relative position of cables, winches and pulleys in the apparatus.

Referring to FIGS. 1 and 2, it is seen that robot 20 comprises a vertical track 22 formed of hollow vertical track rods 24, and a turntable 26 which provides means to rotate vertical track 22 about a 360 degree arc.

Mounted for movement up and down along track 22 is an arm-bearing bracket 28 which, in addition to apertures for rods 24 comprises a diamond-shaped aperture for passage of arm 30. Arm 30 rests on four sets of roller bearings mounted on the lower surfaces of the passage and which are not shown but are conventionally used in the mechanical arts and is adapted to be moved back and forth through bracket 28 on the roller bearings.

Motion is impacted by three motor-driven cable systems, each of which comprises a length of cable, pulleys or sheaves for facilitating the movement of said cable, biasing means for maintaining desired tension on said cables and a winding means for the cable operation. (See FIG. 2) In each case, the winch is mounted between the ends of the cable which it is moving so that movement of the winch (about which are wound several windings of cable) pulls one end of the cable while feeding out the cable demanded by the integrated movement being imparted to the robot arm by the sum of the action of all three cable/winch systems.

Upper pulleys 32 and 33 for the cable system are housed in an upper housing bracket 36. Pulleys 42 and 43 for horizontal arm movement are housed within cavities of the central bracket 28.

Cable 50 is the operating cable for moving arm 30 in and out of bracket 28. One end of the cable is attached to the arm 30 near each end thereof. Cable 50 feeds from an initial anchoring position 48 back over pulley 43 downwardly around the horizontal, or arm-operating winch 52, around the winch for several turns thence upwardly to pulley 33, downwardly to pulley 42 and back to its terminal anchoring position at 54. The anchoring positions are selected to assure they will not engage the pulley or pulley-holding bracket during the desired travel path.

Similarly, bracket 28 is itself carried in a vertical direction in response to the movement of a cable 60 which is attached to the bracket at anchor positions 62 and 64. Rotation of winch 66 will cause the cable to carry the up and down tracking rods 24.

Each combination of motor, gear box, winch, and potentiometer is assembled so that the individual parts rotate together. Thus, referring to FIG. 3, it is seen that the turntable motor 80 is aligned on a common shaft with gear box 82, winch 84 and potentiometer 86 below turntable 90 which comprises a rotary mounting plate 92 and a grooved circumference for receiving turntable cable 62.

Figure 3:
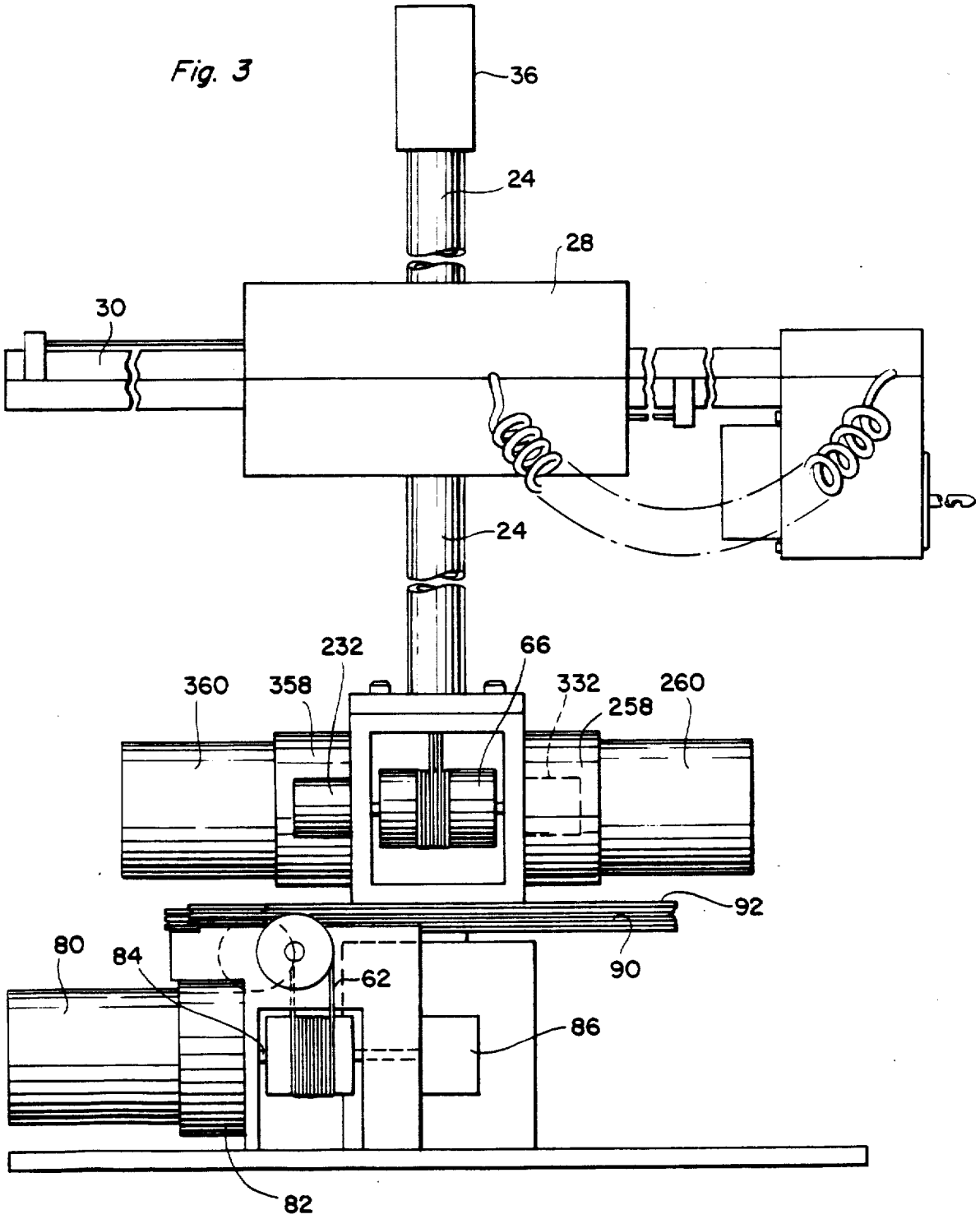
FIG. 3 is a somewhat schematic elevation of the apparatus of the invention indicating the relative position of the motors and principal robot member.

Also seen in FIG. 3 and numbered to correspond with FIG. 5, are the horizontal, or arm, motor 360, its gear box 358, its winch 52 (hidden), and its potentiometer 332. Also seen on FIG. 3 are the vertical control motor system comprising vertical motor 260, its gear box 258, its winch 66, and its potentiometer 232.

Winch 66 is connected, on a common shaft, to turn with a multiturn potentiometer 232 (described below) and gear box 258 of motor 260.

Likewise winch 358 is connected on a common shaft to turn with a multiturn potentiometer 332 and gear box 358 of motor 360.

The illustrated cable arrangement is of particular value in tying in the horizontal and vertical movement of the arm by having each anchored to the bracket 28. In this arrangement, for example, the arm will move horizontally when the block moves downwardly unless, of course, horizontal movement counteracts the effect. This interacting cable arrangement facilitates a smooth control of the robot as will be described below.

FIG. 5 describes the operation of the motors. Specific detail is set forth only for the horizontal and vertical motors which can interact to assure desirable tracking characteristics for the robot arm. It will be understood that the turntable motor can be driven by a similar circuit.

The circuit described as FIG. 4 has as its object the generation of three modulated, pulse-width signals for vertical, horizontal and rotary motion of the robotic arm.

Any appropriate controlling computer 200 is connected through a standard buss interface 202 to a series of three digitally programmable one-shot multivibrators. An example of a device readily utilized for this function is a programmable interval timer 203 sold by Intel Corporation under the trade designation Intel8523. This device is well known in the art and its use is described, among other places, in Intel Corporation's publications entitled "The 8086 Family User's Manual" (October, 1979) and "Component Data Catalog" (January, 1981). (However, it is not believed that the precise use described herein is disclosed anywhere in the prior art.)

An oscillator 204 is connected to the clock inputs of the one-shots has a frequency of about 1 megacycle. (However it should be realized that the frequency could be up to the maximum count rate of the particular one-shot. Lower frequencies could be used but this is generally undesirable. Such lower frequencies will cause reduction in resolution or a reduction in the frequency of the pulse rate modulated signal outputs.)

The one-shots generate a pulse which is proportional to their digital inputs up to maximum value permitted by the frequency divider counter 205 which is suitably of thirteen binary bits or a count of 8192 decimal.

The percentage of "on" time (as opposed to "off" time) of the output pulses from the one shots of timer 203 is proportional to the input digital data and the frequency of the output is equal to the oscillator frequency divided by the frequency of the divider counter. These signals are sent over a transmission line from the computer to the robotic arm-operating mechanisms as shown schematically at 206, 207 and 208. This has the advantage that the information component of the signal is in the time domain and is not directly dependent upon the voltage levels or voltage drop in the cable. Typical useful pulse width inputs profiles are shown in FIG. 6. These inputs cause a change-of-state of a C-MOS switch 210, typically a National Semiconductor Model No. 4053, which switches the output from voltage reference to ground through a pair of resistors 212 and 214. This switching is smoothed by capacitor 216 followed by an integrating amplifier 220 whose time constants, together, filter the AC component out of the pulse-width-signal.

It is well to note that the reference voltage (at 230) to the C-MOS switch 210 is the same as the reference voltage (at 230a) to the feedback potentiometer 232. This is the potentiometer associated directly with motor and winch. Thus the input signal becomes independent of voltages generated other than the reference voltage. Moreover, because the input switch (210) and feedback potentiometer (232) both ratio the reference voltage, that voltage is not itself critical except that there be no substantial difference between the reference tied to the input switch 210 and the feedback potentiometer. Tracing the signal from potentiometer 232, the wiper 234 of potentiometer 232 is connected to a feedback repeater amplifier 240 which forms means to minimize or reduce the effect of loading on the potentiometer 232. (A load resistor connected across the potentiometer would normally cause a non-linearity of the feedback signal, i.e., a undesirable difference between the feedback signal and the actual position of the potentiometer.) The feedback voltage is then summed together with the input voltage which is of opposite polarity. The difference in feedback and input voltages is suitably amplified in difference amplifier 250. The amplified signal is sent to powerdriver 252 which generates the necessary voltage to drive the permament magnet direct current motor that moves the "vertical" servo drive mechanism 260. The stabilizing network 256 which is connected from the motor input back to the summing junction prevents oscillation of the total system. Use and design of such stabilizing networks is well known in the art.

The vertical drive gear box 258 has a relatively high gear ratio which increases the lifting force yet, at the same time, limits the vertical speed of the motor which causes the vertical lift and, thus, limits the speed of the robot arm lift motion. This has the advantage of allowing the horizontal servo 334–360 system to track the position of the vertical motion with minimum error and provides for the force necessary for the verticle servo to lift a large mass.

The direct current motor 260, the gear box 258, the cable pulley 66, or sheave, and the multiturn feedback potentiometer 232 are connected to a common shaft. Thus the position of the vertical motion is locked directly to the motor 260 and the feedback potentiometer 232.

Referring to FIG. 6, showing the processing of the pulses width input to the horizontal drive control system (300) goes through the same process of being switched from reference voltage to ground through the resistances that are in series with those leads and is smoothed by the integrating inverting amplifier 220 as in the vertical motion circuitry. The resulting D.C. voltage is summed together with the feedback from the horizontal feedback potentiometer 334 along with a signal that is inversely proportional to the feedback signal from the vertical feedback potentiometer 232 through a signal inverting potentiometer 400. This signal causes the horizontal servo 360 to closely track the position of the vertical servo 260 allowing the cable system controlling the arm to be of simple construction. When the arm is raised, the horizontal cable 60 must be moved exactly synchronously with it to provide that a tool mounted on arm 30 to move directly upward. The inverse is true when arm 30 is to be moved in: a downward direction. To accomplish this, the horizontal gear box 358 has a lower gear ratio allowing higher speeds in the horizontal direction and, hence a faster response than is provided by the vertical gear box 258. This is permissible and convenient because horizontal arm 30 does not need to lift mass.

Thus forces generated on the cable and sheave will be suitably low despite the relatively rapid movement of the arm in a horizontal direction. The horizontal stabilizing circuitry, of course, will be optimized forthe different speed. This stabilizing is within the ordinary skill of the art.

It is also to be understood that the following claims are intended to cover all of the generic and specific features of the invention herein described and all statements of the scope of the invention which might be said to fall therebetween.

What is claimed is:

1. In a robot apparatus of the type comprising means to move a robot arm in a vertical direction, and in a horizontal direction substantially co-axial with said arm, and means to rotate said arm through a plane co-planar with said horizontal direction, the improvement wherein the means to move comprises motor means mounted on a horizontal turntable with winch means for operating horizontal cable means and vertical cable means, respectively, and the means to rotate comprises a turntable-rotating motor; means with winch means for operating said turntable and said vertical cable means comprising a first cable means for moving said robot arm vertically, and first cable means being fastened at each end to an arm-holding bracket adapted to slide on vertical tracks and said first cable means being looped around a winch which is part of said winch means for operating the vertical cable means proximate the bottom of said track and around a pulley proximate the top of said track, and said horizontal cable means comprising a second cable means to move said arm horizontally through said bracket, said second cable means having ends of which are attached to said arm near the ends of said arm on opposite sides of said bracket; and wherein the second cable means runs from one said cable end to a pulley in said bracket downwardly *around a winch means and thence upwardly* to a pulley mounted proximate the top of said vertical track, downwardly around a second pulley attached to said bracket and thence to the other of said cable ends.

2. A robot apparatus as defined in claim 1 wherein said motor means are direct current servo motors and wherein said cable means are steel cables.

3. A robot apparatus as defined in claim 1 wherein said motor means for moving said arm in vertical or horizontal directions is controlled by a motor control system including means to sense the vertical and horizontal position of said robot arm and sensing means comprising a potentiometer mounted on said turntable and forming means to measure the rotational position of each said winch means and connect said rotational position into an electrical signal which resulting signals are co-ordinated through a servo-system with one another to achieve a smooth movement of said robot arm.

4. A robot as defined in claim 1 wherein said arm is adapted to slide back-and-forth within said support bracket in a horizontal direction in response to a first motor and is adapted to move in vertical direction in response to a second motor which forms means to move said bracket, the improvement comprising motor control means whereby said first motor is operated at a speed of at least four times the maximum gear-speed ratio of said second motor.

5. A robot as defined in claim 4 wherein the motor control system of said first motor comprises a signal inversion means allowing its operating speed to be determined, at least in part, by the control system for said second motor.

6. Apparatus as defined in claim 1 wherein each of said first cable means and said second cable means comprise two segments, each said segment having one end terminating on the winch about which each said cable is looped.

* * * * *